(12) United States Patent
Myers et al.

(10) Patent No.: US 11,115,569 B1
(45) Date of Patent: Sep. 7, 2021

(54) RUGGEDIZED CAMERA SYSTEM FOR AEROSPACE ENVIRONMENTS

(71) Applicant: United States of America as represented by the Administrator of NASA, Washington, DC (US)

(72) Inventors: Jeremy Dwight Myers, Taft, TN (US); Jonathan Eugene Pryor, Madison, AL (US); Jarret Carl Bone, Madison, AL (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 0 days.

(21) Appl. No.: 16/998,837

(22) Filed: Aug. 20, 2020

(51) Int. Cl.
*H04N 5/225* (2006.01)
*G03B 3/10* (2021.01)
*G03B 17/08* (2021.01)

(52) U.S. Cl.
CPC ............ *H04N 5/2252* (2013.01); *G03B 3/10* (2013.01); *H04N 5/2254* (2013.01); *G03B 17/08* (2013.01)

(58) Field of Classification Search
CPC ...... H04N 5/2252; H04N 5/2254; G03B 3/10; G03B 17/08
See application file for complete search history.

(56) References Cited

U.S. PATENT DOCUMENTS

| 7,133,608 B1 * | 11/2006 | Nagata | G03B 13/02 396/374 |
|---|---|---|---|
| 9,007,520 B2 | 4/2015 | Azuma et al. | |
| 2002/0067424 A1 | 6/2002 | Brunner, Jr. | |

(Continued)

FOREIGN PATENT DOCUMENTS

| CN | 108073017 A | 5/2018 |
|---|---|---|
| GB | 2531022 A | 4/2016 |
| WO | WO 2009046513 A1 | 4/2009 |

OTHER PUBLICATIONS

Proceedings of SPIE: "Micro-cameras For Space Applications", Presented at SPIE Defense and Security Symposium, Orlando, Florida, Apr. 15, 2008.

(Continued)

*Primary Examiner* — Amy R Hsu
(74) *Attorney, Agent, or Firm* — James J. McGroary; Helen M. Galus

(57) ABSTRACT

A ruggedized camera system provides high-quality optical data signals while operating in harsh environments and includes a housing having an electronics housing section and a lens housing section. A light-ring circuit is attached to the lens housing section. A diffuser ring is attached to the lens housing section and covers the light-ring circuit. The camera system includes camera electronics that process optical data captured by the camera optical lens. The camera electronics are secured within a camera electronics holder that is located within and attached to the electronic housing section and which minimizes vibrations to the camera electronics. A power circuit is inside and attached to the electronic housing section and provides power to the camera electronics and the light-ring circuit and receives serial command data being transmitted to the camera electronics. The housing tightly integrates the camera optical lens, the camera electronics holder, the light-ring circuit and power circuit.

20 Claims, 9 Drawing Sheets

(56) References Cited

U.S. PATENT DOCUMENTS

| | | | |
|---|---|---|---|
| 2005/0151876 A1 | 7/2005 | Karr | |
| 2007/0242134 A1* | 10/2007 | Zernov | B63G 8/001 |
| | | | 348/81 |
| 2009/0189994 A1* | 7/2009 | Shimonaka | H04N 5/772 |
| | | | 348/222.1 |
| 2017/0230548 A1* | 8/2017 | Costa | G03B 17/55 |
| 2020/0341227 A1* | 10/2020 | Tsujikawa | G03B 17/02 |

OTHER PUBLICATIONS

Technical data sheet for "MCAMv3 Digital Space Micro-Camera", Micro-cameras & Space Exploration SA Data sheet available on-line at least as early as May 2020.
Technical data sheet for "ECAM-C30, Color CMOS Camera, 3 Megapixel", Malin Space Science Systems, Copyright 2013.
Technical data sheet for "Cheetah C5180 CMOS 25 MP Camera", Imperx Industrial Cameras & Imaging Systems, Copyright 2019.

* cited by examiner

RUGGEDIZED CAMERA SYSTEM FOR AEROSPACE ENVIRONMENTS

ORIGIN OF THE INVENTION

The invention described herein was made by employees of the United States Government and may be manufactured and used by or for the Government of the United States of America for governmental purposes without the payment of any royalties thereon or therefor.

CROSS-REFERENCES TO RELATED PATENT APPLICATIONS

None.

TECHNICAL FIELD

The present invention relates to a ruggedized camera system configured for aerospace environments.

BACKGROUND

Camera systems are used in many applications, including aviation and space explorations. The environments in which such camera systems are used are harsh, often exhibiting extreme temperatures and high levels of radiation. Furthermore, the camera system is subjected to severe vibrations upon vehicle launch or during flight. In addition to withstanding such harsh environments, the camera system must be able to meet specific imagery requirements such as video quality requirements. In many aerospace applications, specific digital video interfaces are utilized and the output of the camera system must be compatible with such required digital video interface. One such digital video interface is known as HD-SDI or High-Definition Serial Digital Interface. However, prior art camera systems do not have the required configurations that allow the camera system to withstand the harsh environments of aerospace applications while simultaneously meeting the specific video quality requirements.

What is needed is an improved camera system for aerospace applications and environments that addresses the problems and deficiencies of prior art camera systems.

SUMMARY OF THE INVENTION

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of a ruggedized camera system for aerospace environments are disclosed herein. The camera system is configured to provide quality optical data signals while operating in the harsh environments of the earth's atmosphere and space wherein the camera system may be subject to vibrations and shock, temperature extremes, vacuum forces, moisture, humidity and radiation. In an embodiment, the camera system includes an M12 lens interface that allows the camera system to use a variety of optical lenses including those with a significantly wide field of view. The camera system includes a housing and an LED light-ring circuit that is mounted to the housing near the camera optical lens. The LED light-ring comprises a plurality of high-power LEDs and linear LED drivers that are mounted to a circular circuit board having a central opening. The field of view of the camera optical lens extends through the central opening of the circular circuit board. The camera system further includes a diffuser ring that covers the LED light ring. The camera system includes camera electronics that process optical data captured by the camera optical lens and provide this processed optical data as optical data signals which include video signals. The camera electronics are tightly positioned within a rugged camera electronics holder that is located within the interior of the housing and is attached to the housing. The rugged camera electronics holder holds and secures the camera electronics and protects the camera electronics from vibrations and shocks. The camera system further comprises a power circuit that provides power to all camera electronics, including the LED light-ring circuit and LED drivers. The power circuit receives serial command data being transmitted to the camera and also protects the camera electronics. In an embodiment, the power circuit is a rigid-flex printed circuit that comprises rigid circuit board sections and flexible circuit sections. The power circuit is configured to allow the camera electronics to be safely powered with vehicle power. The housing of the camera system tightly integrates the camera optical lens, the rugged camera electronics holder, the LED light-ring, diffuser and the power circuit. In some embodiments, the interior of the housing is completely filled with potting material. The potting material provides further resistance to shock and vibrations and protects the electronics from water, moisture or other corrosive agents and prevents gaseous phenomena such as corona discharge. There are many applications in which the camera system may be used including, but not limited to, space, aviation, exploration, automotive racing, extreme sports, military vehicles and manufacturing.

In some embodiments, the ruggedized camera system for aerospace environments comprises a housing having an electronics housing section and a lens housing section attached to the electronics housing section. The electronics housing section has a rear side, a forward side and an interior region for the placement of camera electronics and other electronic components. The forward side has an open region that is adjacent to the lens housing section. A cover member is attached to the electronics housing section so as to cover the interior region. The ruggedized camera system further comprises a camera electronics holder that is positioned within the interior region of the electronic housing section and is attached to the housing. The camera electronics holder comprises a rear portion, a pair of opposing side portions that are contiguous with the rear portion and an open front that is situated within the open region in the forward side of the electronics housing section. The rear portion and side portions define an inner space that is configured to receive camera electronics and prevent movement of the camera electronics when the camera system is subjected to vibrations or physical shock. The rear portion of the camera electronics holder has a plurality of openings therein that are in communication with the inner space of the camera electronics holder. Camera electronics are positioned within the inner space of the camera electronics holder and secured to the camera electronics holder. The camera electronics includes a plurality of signal connectors. Each signal connector is aligned with a corresponding opening in the rear portion of the camera electronics holder. A lens assembly is positioned within the lens housing section and comprises a lens interface rotatably attached to the lens housing section such that the lens interface is rotatable in a clockwise direction and in a counter-clockwise direction. The lens assembly further comprises a lens holder attached to the lens interface and an optical lens secured within the lens holder and in optical communication with the camera electronics. The ruggedized camera system further comprises a light-ring circuit that is attached to the lens housing structure and which extends about the optical lens. A diffuser is attached to the lens housing structure so as to cover the light-ring circuit. The ruggedized camera system further comprises a plurality of electrical connectors attached to the exterior side of the electronics housing section and a semi-flexible electrical circuit that is located within the interior region of the electronics housing section. The semi-flexible circuit comprises a plurality of rigid circuit board sections and a plurality of flexible circuits. Each flexible circuit is located between and in electronic signal communication with a pair of rigid circuit board sections. A first one of the rigid circuit board sections is attached to the interior side or wall of the electronics housing section. A second one of the rigid circuit board sections is in electronic signal communication with the plurality of electrical connectors. A third one of the rigid circuit board sections is in electronic signal communication with the camera electronics and the light-ring circuit.

DETAILED DESCRIPTION

As used herein, the terms "comprises", "comprising", "includes", "including", "has", "having" or any other variation thereof, are intended to cover a non-exclusive inclusion. For example, a process, method, article or apparatus that comprises a list of elements is not necessarily limited to only those elements, but may include other elements not expressly listed or inherent to such process, method, article or apparatus.

Approximating language, as used herein throughout the specification and claims, may be applied to modify any quantitative representation that could permissibly vary without resulting in a change in the basic function to which it is related. Accordingly, a value modified by a term such as "about" or "approximately" is not limited to the precise value specified.

Reference in the specification to "an exemplary embodiment", "one embodiment" or "an embodiment" means that a particular feature, structure or characteristic described in connection with the embodiment is included in at least one embodiment of the invention. The appearances of the phrases "an exemplary embodiment", "one embodiment" or "embodiment" in various places in the specification are not necessarily all referring to the same embodiment.

As used herein, "camera electronics" refers to the electronic circuitry, circuit boards, electronic components, signal connectors and wiring of the ruggedized camera system disclosed herein.

Figure 9:
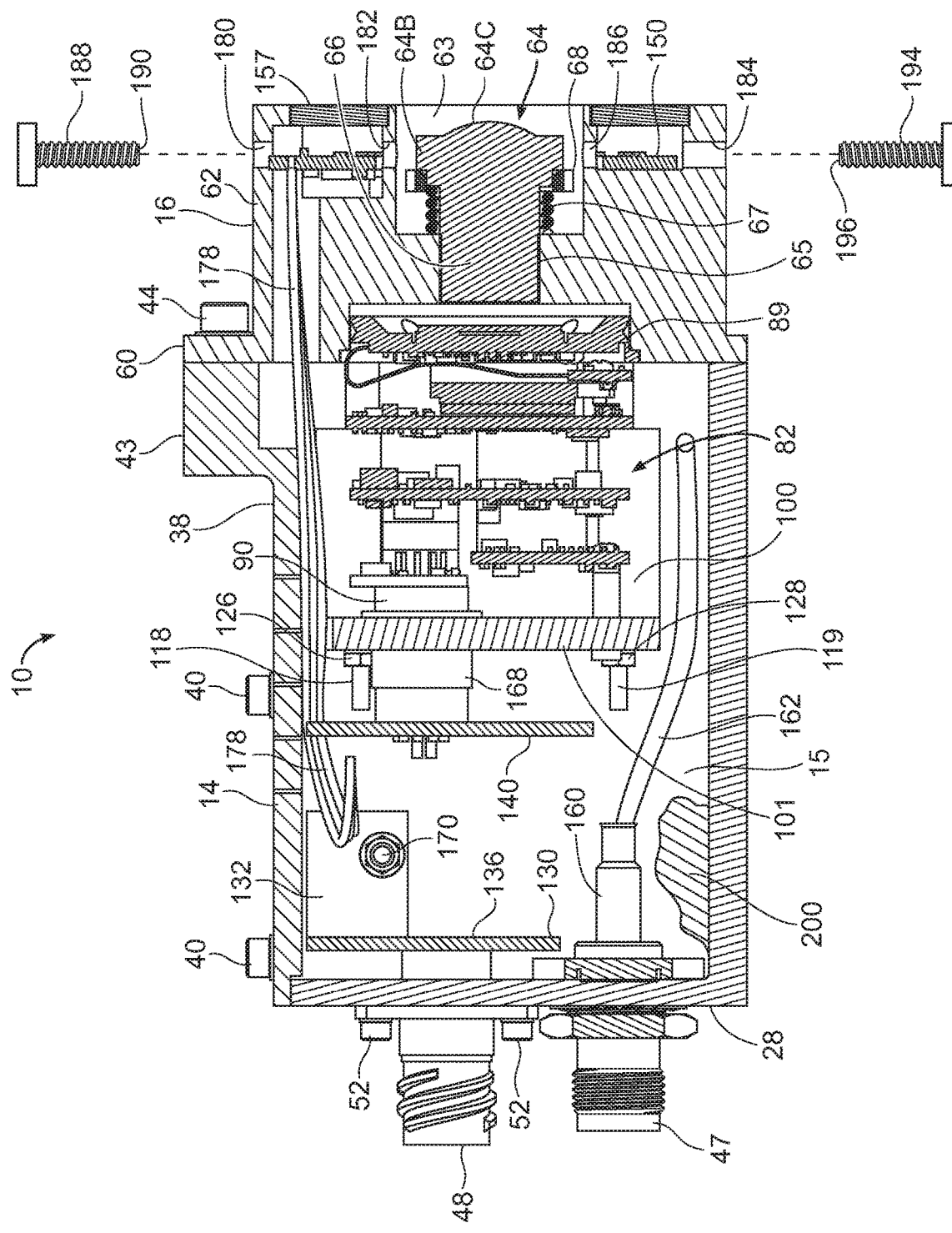
FIG. 9 is a sectional view taken along line 9-9 in FIG. 2.
Figure 10:
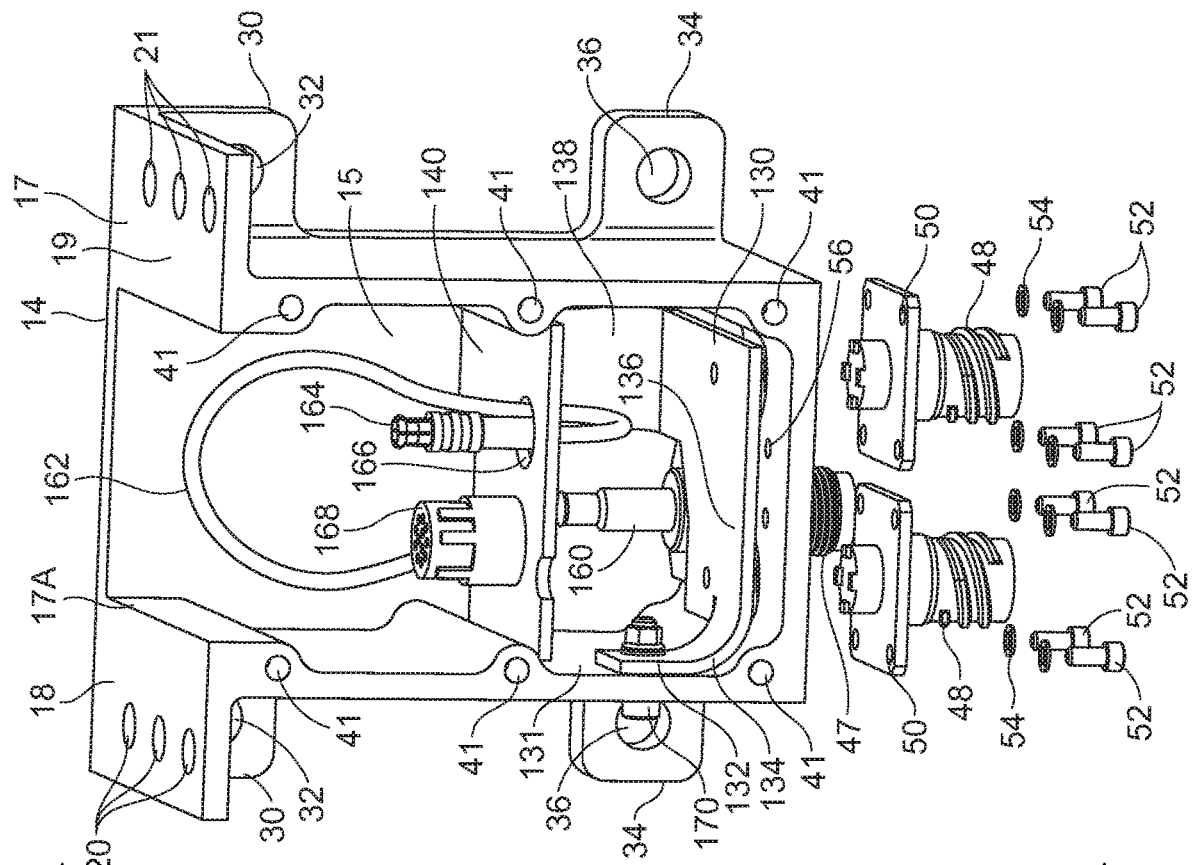
FIG. 10 is an exploded view an electronics housing section of the ruggedized camera system shown in FIG. 1.
Figure 11:
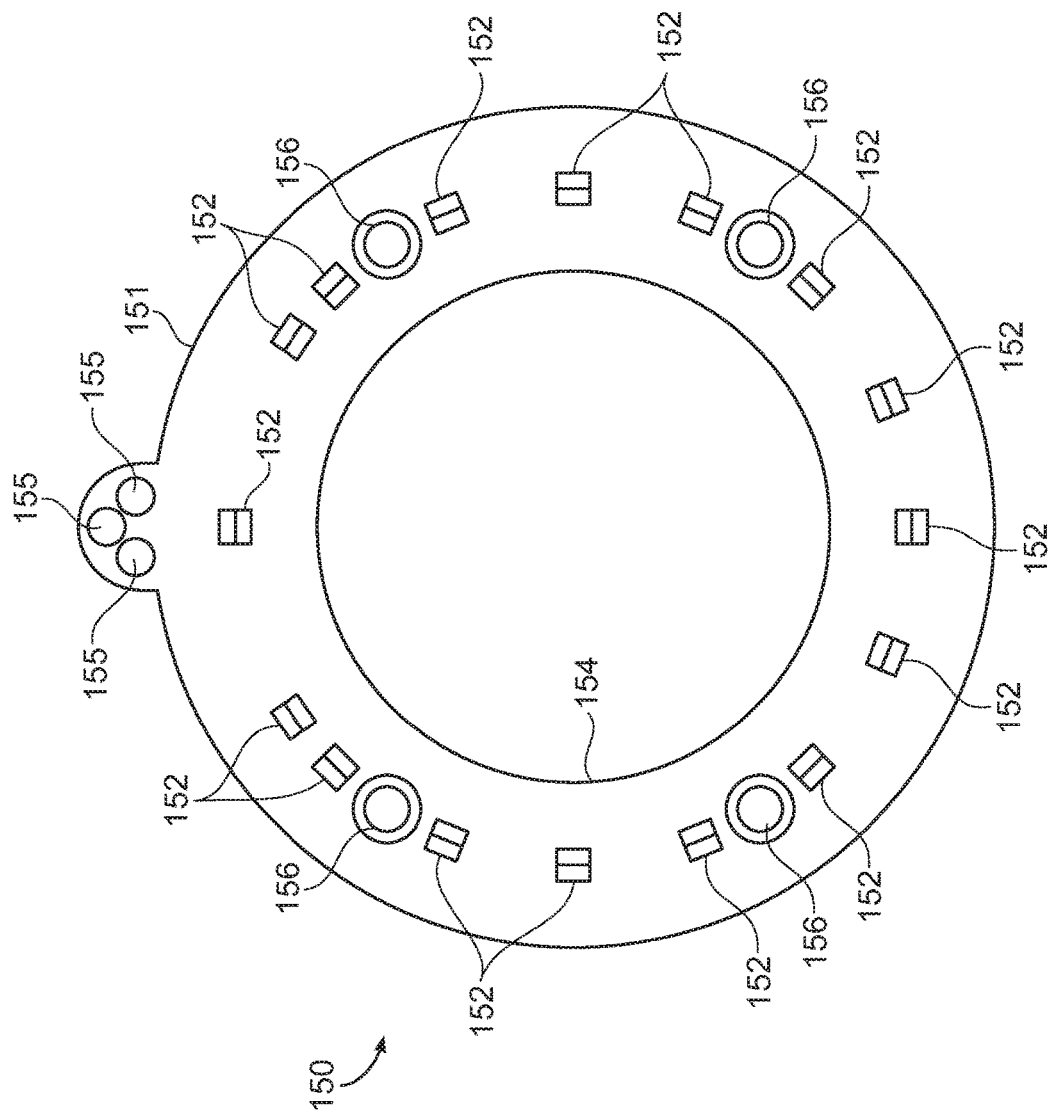
FIG. 11 is a front elevational view of a light-ring circuit shown in FIG. 5.
Figure 12:
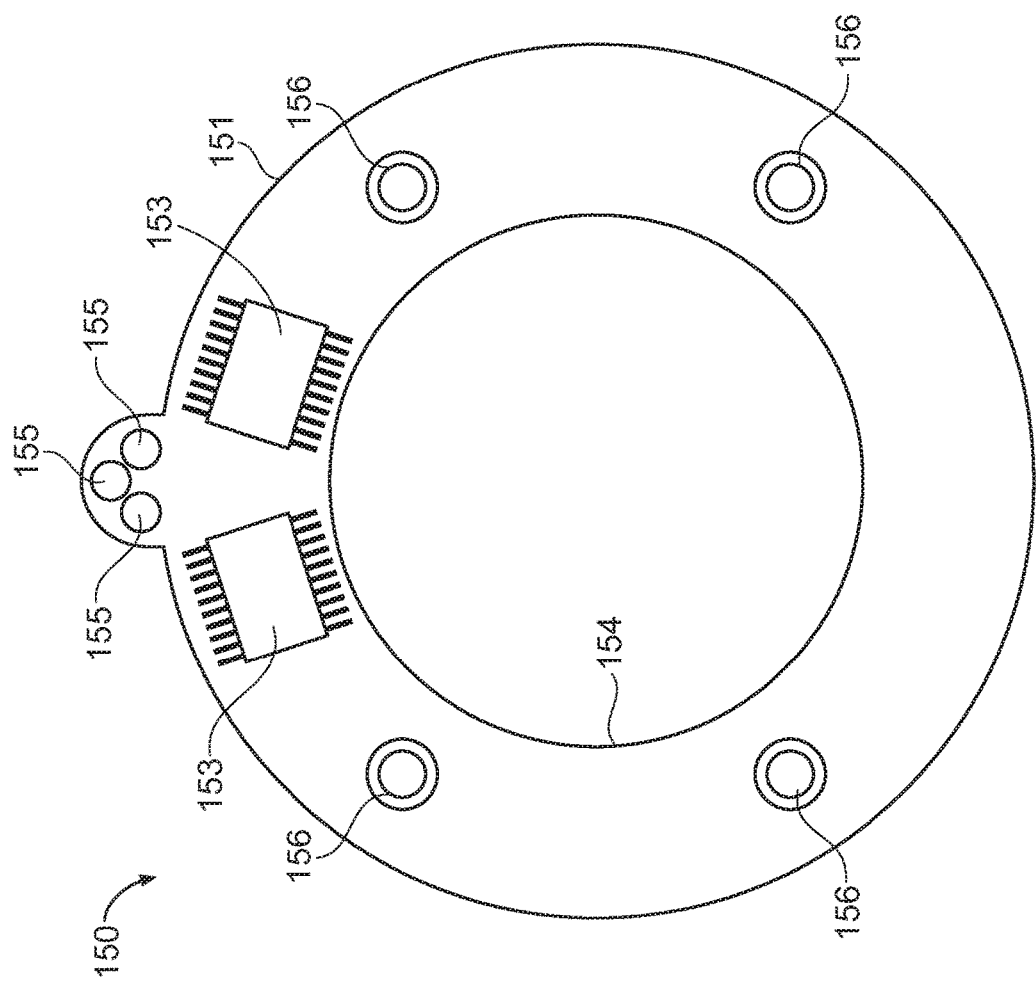
FIG. 12 is a rear elevational view of the light-ring circuit.
Figure 13:
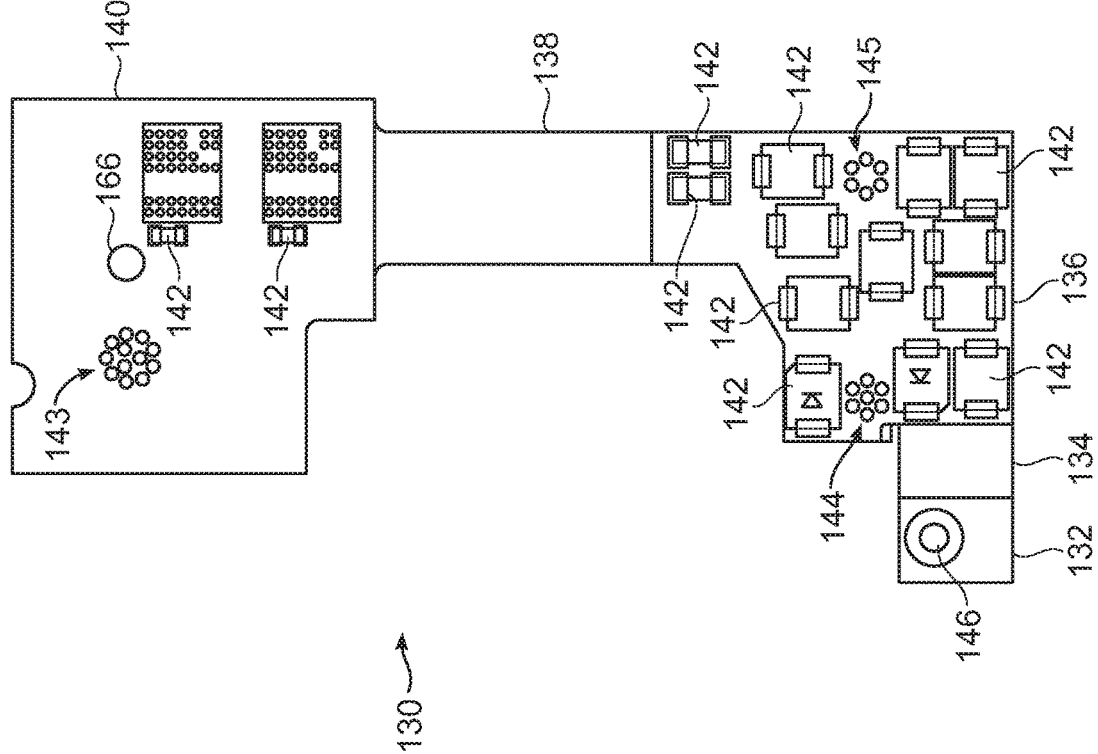
FIG. 13 is a plan view of a power circuit shown in FIG. 10.

Referring to FIGS. 1-3, 9 and 10, there is shown ruggedized camera system 10 in accordance with an exemplary embodiment. Camera system 10 has a housing which comprises camera electronics housing section 14 and camera lens housing section 16. Electronics housing section 14 has interior region 15 for the placement of the camera electronics and other electrical wiring, electronic circuitry and electronic components that are discussed in detail in the ensuing description. Camera lens housing section 16 houses the camera lens assembly and other components that are discussed in detail in the ensuing description. In some embodiments, electronics housing section 14 and lens housing section 16 are removably attached together. As shown in FIG. 10, electronics housing section 14 includes forward side 17 that is adjacent to lens housing section 16. Forward side 17 includes open region 17A that is in communication with interior region 15 and is flanked by flange portion 18 and flange portion 19. Flange portion 18 includes a plurality of thru-holes 20 and flange portion 19 has a plurality of thru-holes 21. Lens housing section 16 comprises front side portion 60 and lens cover structure 62 (see FIG. 3). In an exemplary embodiment, lens cover structure 62 is integral with front side portion 60. In other embodiments, lens cover structure 62 is joined or attached to front side portion 60. Lens cover structure 62 is described in detail in the ensuing description.

Figure 2:
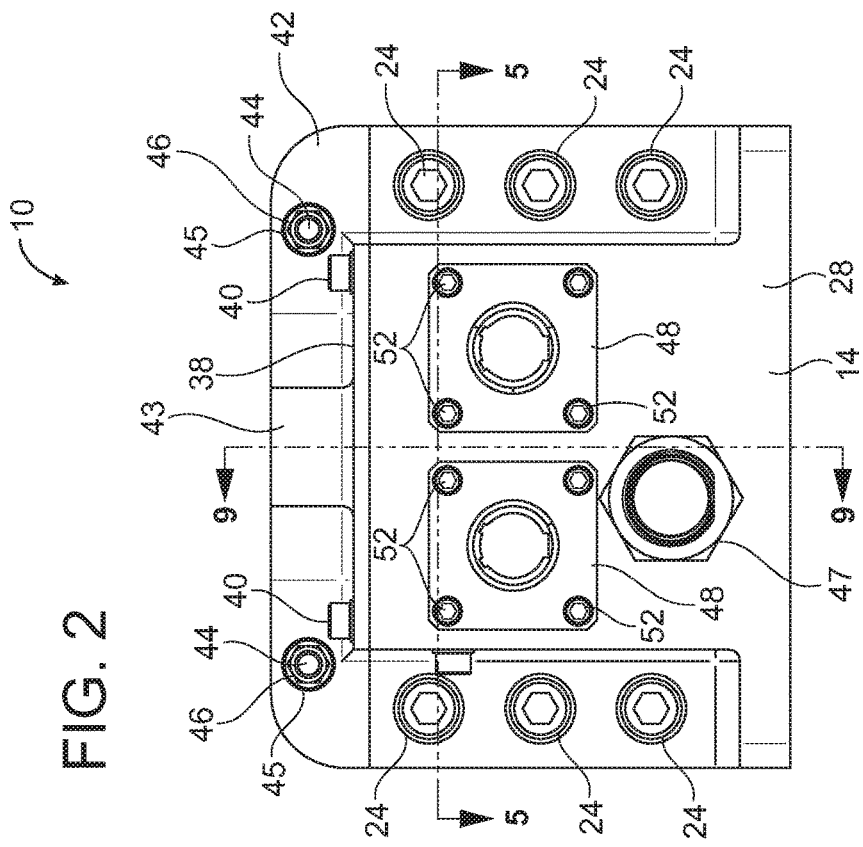
FIG. 2 is a rear view of the ruggedized camera system shown in FIG. 1.
Figure 1:
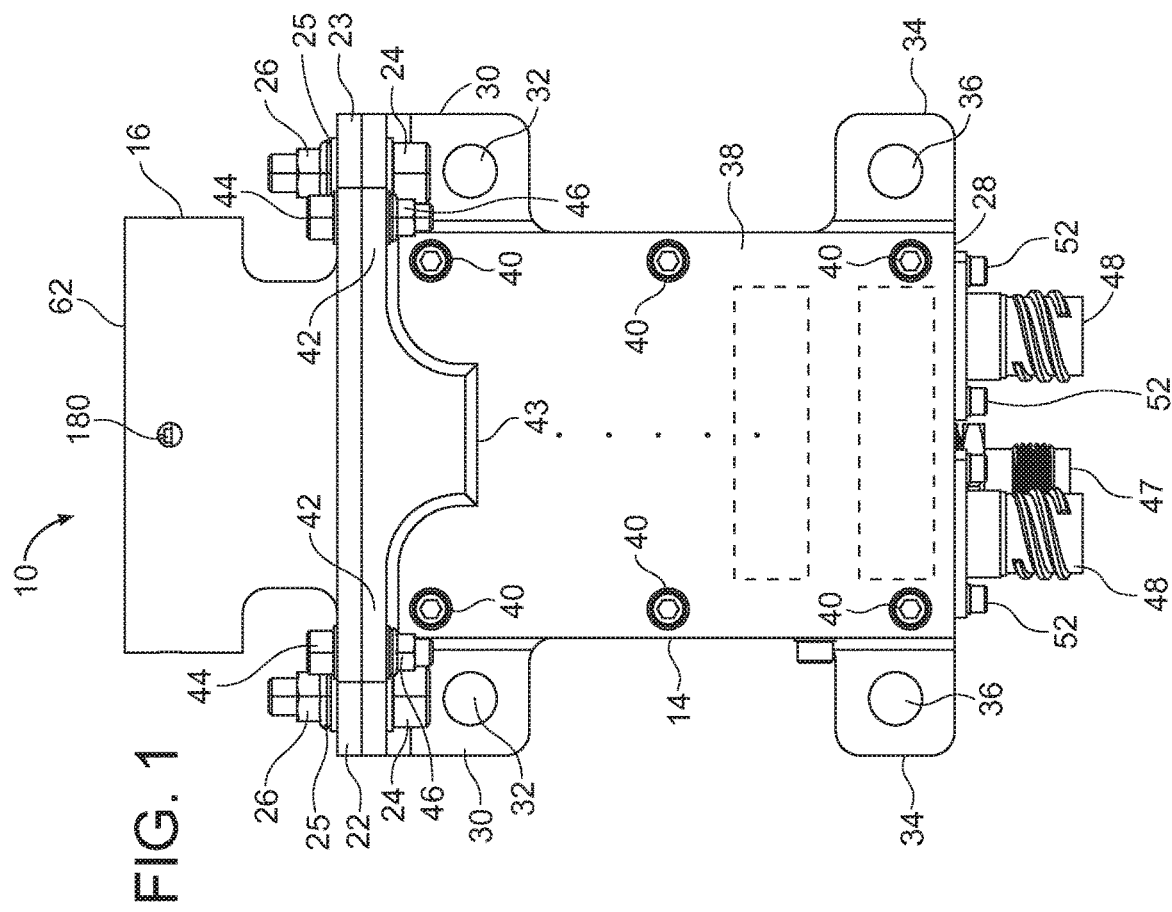
FIG. 1 is a top view of an exemplary embodiment of a ruggedized camera system for aerospace environments.
Figure 3:
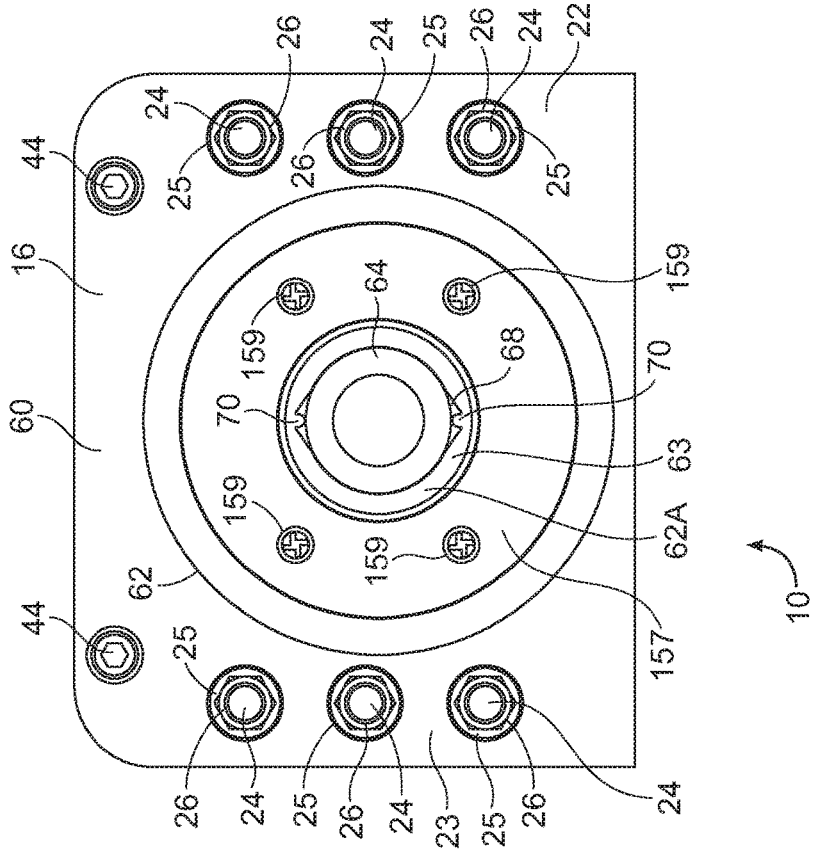
FIG. 3 is a front view of the ruggedized camera system shown in FIG. 1.

Referring to FIGS. 1-3, front side portion 60 of lens housing section 16 comprises flange portion 22 and flange portion 23. Flange portion 22 abuts flange portion 18 of housing section 14 and flange portion 23 abuts flange portion 19 of housing section 14. Flange portion 22 includes a plurality of thru-holes that are aligned with thru-holes 20 in flange portion 18 of housing section 14. Similarly, flange portion 23 has a plurality of thru-holes that are aligned with thru-holes 21 in flange portion 23. In an exemplary embodiment, housing sections 14 and 16 are removably attached to each other via screws 24, washers 25 and nuts 26. Specifically, each thru-hole in each flange portion 18, 19, 22 and 23 is sized to receive a corresponding screw 24. Each washer 25 is mounted on a corresponding screw 24 and then the corresponding nut 26 is tightened so as to firmly attach housing sections 14 and 16. Electronics housing section 16 further includes rear side 28 to which signal connectors 47 and 48 are attached via screws 52. The functions of signal connectors 47 and 48 are discussed in the ensuing description.

Referring to FIGS. 1, 2, 4 and 5, housing section 14 further includes forward horizontal flanges 30. Each flange 30 has thru-hole 32. Housing section 14 further includes rear horizontal flanges 34. Each rear horizontal flange 34 has thru-hole 36. Thru-holes 32 and 36 are sized to receive screws, bolts or other fastening devices. Front horizontal flanges 30 and rear horizontal flanges 32 allow ruggedized camera system 10 to be firmly attached or joined to a structure or to a section of an aircraft, space craft or other type of vehicle or craft. Electronics housing section 14 includes cover member 38. Cover member 38 is fastened down via screws 40 that are threadedly engaged with threaded inlets 41. Cover 38 includes forward flange portion 42 that abuts and is attached to lens housing section 16. Forward flange portion 42 includes central portion 43 that is formed of solid material. Central portion 43 provides structural integrity to camera system 10 and provides a solid structure that abuts lens housing section 16 and contributes to the absorption of vibrations. Central portion 43 may be fabricated from materials that exhibit good heat-sink characteristics so as to sink heat from lens housing section 16.

Referring to FIGS. 1, 2, 4, 5, 9 and 10, electronics housing section 14 further includes video signal connector 47 and electronic signal connectors 48 that are attached to rear side 28 of electronics housing section 14. Connectors 48 have thru-holes 50 for receiving screws 52. Each screw 52 has a corresponding washer 54. Screws 52 are configured to be threadedly engaged with threaded thru-holes 56 in rear side 28. Video signal connector 47 is attached to rear side 28 in a similar manner.

As shown in FIGS. 1-4, 8 and 9, screws 44, washers 45 and nuts 46 attach the upper portion of front side portion 60 to forward flange portion 42 of cover 38. In an exemplary embodiment, lens cover structure 62 is integral with front side portion 60. In other embodiments, lens cover structure 62 is a separate component and is rigidly attached or joined to front side portion 60. In an exemplary embodiment, lens cover structure 62 has a substantially cylindrical shape that has a distal end portion. Lens cover structure 62 has interior region 63 that is sized for receiving lens assembly 64. Lens cover structure 62 includes front opening 62A that is in communication with interior region 63 and which provides the field of view for optical lens 64C which is described in the ensuing description. In an embodiment, lens assembly 64 comprises an M12 lens interface 66. The M12 lens interface 66 has threads thereon and allows camera system 10 to use a variety of lenses including those with a significantly wide field of view. M12 lens interface 66 includes portion 64A that is configured to receive an infrared (IR) cut filter (not shown) if necessary. M12 lens interface 66 is known in the art and is therefore not described in detail herein. Lens assembly 64 further comprises lens holder 64B that is attached to M12 lens interface 66. Lens holder 64B is known in the art and is therefore not described in detail herein. In an exemplary embodiment, lens holder 64B is removably attached to M12 lens interface 66. In another embodiment, lens holder 64B is rigidly attached to M12 lens interface 66. Lens assembly 64 further comprises optical lens 64C that is removably secured within lens holder 64B. Lens cover structure 62 further includes threaded bore 65 that is in communication with open region 17A in forward side 17 of electronics housing section 14. The threads on M12 lens interface 66 (see FIG. 8) threadedly engage threaded bore 65 thereby allowing M12 lens interface 66 to be screwed into threaded bore 65. Optical lens 64C is focused by rotating M12 lens interface 66 in either the clockwise direction or the counter-clockwise direction until the desired focus is achieved. As shown in FIG. 9, lens assembly 64 further includes spring member 67 that is mounted on M12 lens interface 66 such that spring member 67 is interposed between lens holder 64B and the portion of lens housing section 16 that extends around threaded bore 65. Spring member 67 produces tension or force on the threads of M12 lens interface 66 in order to cause firm contact between the threads on M12 lens interface 66 and threaded bore 65 so as to prevent jitter or irregular movement of M12 lens interface 66 when positioned within threaded bore 65. Lens assembly 64 further comprises torque-tool receiving member 68 that is mounted on M12 lens interface 66 and which allows a user to insert a torque tool (not shown) through front opening 62A of lens cover structure 62 and into interior region 63 to rotate M12 lens interface 66 in either a clockwise or counter-clockwise direction in order to focus optical lens 64C. The torque tool (not shown) has prongs that fit into notches 70 (see FIG. 8) of torque-tool receiving member 68.

Figure 6:
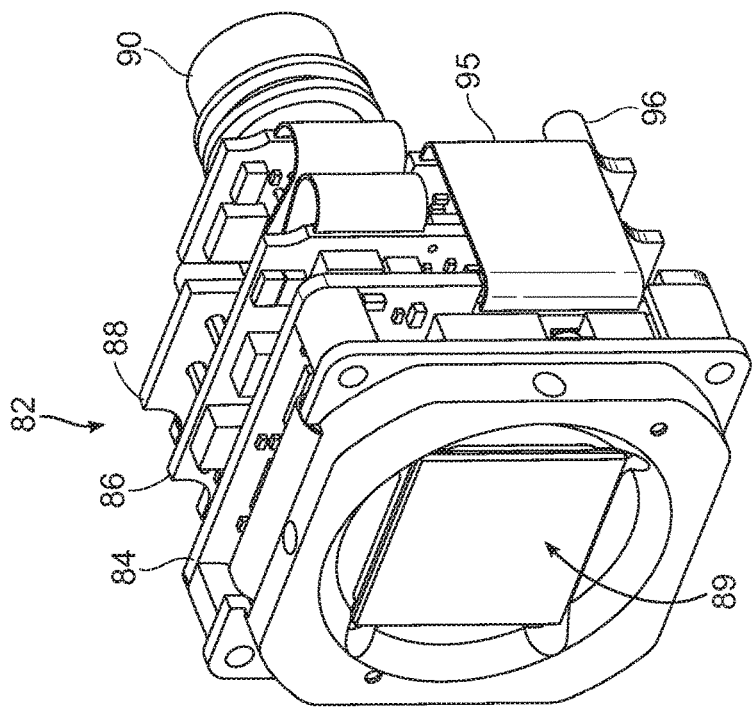
FIG. 6 is a perspective view of the camera electronics of the ruggedized camera system shown in FIG. 1.
Figure 7:
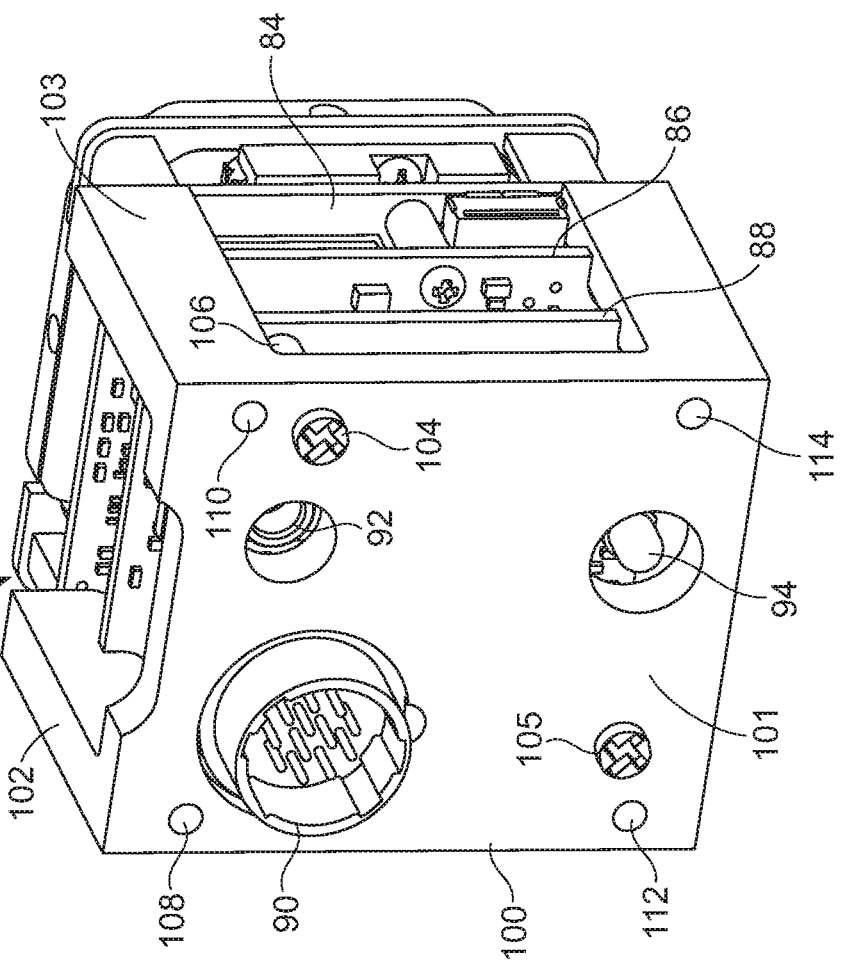
FIG. 7 is a rear perspective view of a ruggedized camera electronics holder that holds and secures the camera electronics.

Referring to FIGS. 6 and 7, there is shown camera electronics 82. In some embodiments, camera electronics 82 comprises commercially available camera electronics that are configured to operate in harsh environments, and in particular, environments in which there are significant vibrations and extreme temperatures. In an exemplary embodiment, camera electronics 82 comprises the camera electronics of the commercially available Imperx® Cheetah C2010 3G-SDI, which is a full HD camera with an HD-SDI video output. The Imperx® Cheetah C2010 3G-SDI has a power consumption of about 3.6 W, a current draw of about 300 mA@12 VDC, has a Global Shutter (GS) and is able to operate within the temperature range of −40° C. to +85° C. Camera electronics 82 includes circuit boards 84, 86 and 88. Various integrated circuits and electronic components are mounted to circuit boards 84, 86 and 88 which process image data signals including video signals. Camera system 10 includes glass cover 89 that covers the camera sensor (not shown). Camera electronics 82 further includes a signal connector 90, a video signal connector 92 and a indicator LED (light-emitting diode) 94 (see FIG. 7). Indicator LED 94 is illuminated when camera electronics 82 receives electrical power. Camera electronics 82 further comprises circuit board bracket member 95 that holds circuit boards 84, 86 and 88 together. Circuit board bracket member 95 includes standoff 96 which has a threaded inlet (not shown). The purpose of standoff 96 will be apparent from the ensuing description.

It is to be understood that the camera electronics of the aforementioned Imperx® Cheetah C2010 3G-SDI camera are in accordance with just an exemplary embodiment and that camera electronics 82 may comprise the camera electronics of other suitable commercially available cameras that have substantially the same configuration and operating characteristics as the aforementioned Imperx® Cheetah C2010 3G-SDI camera.

Referring to FIG. 7, camera system 10 further includes ruggedized camera electronics holder 100 for holding and securing camera electronics 82. Camera electronics holder 100 comprises rear wall 101, side wall 102 and side wall 103. Rear wall 101 and sidewalls 102 and 103 define an inner space for receiving camera electronics 82. Each sidewall 102 and 103 has open portions thereby allowing viewing of camera electronics 82. Camera electronics holder 100 is configured so that camera electronics 82 are also viewable from the top of camera electronics holder 100. Signal connector 90 extends through an opening in rear wall 101. The video signal connector 92 is accessible through a corresponding opening in rear wall 101. Camera electronics holder 100 includes thru-holes in rear wall 101 for receiving screws 104 and 105. Screw 104 is engaged with threaded standoff member 106 (see FIG. 7) and screw 105 is engaged with threaded standoff member 96 (see FIG. 6). Standoff members 96 and 106 are attached to one or more of the circuit boards of camera electronics 82. Camera electronics holder 100 has an open front, indicated by reference number 107 in FIG. 7, from which portions of camera electronics 82 extend. Camera electronics holder 100 is positioned within interior region 15 so that open front 107 is situated within open region 17A in forward side 17 and portions of camera electronics 82 extend through open region 17A.

Figure 4:
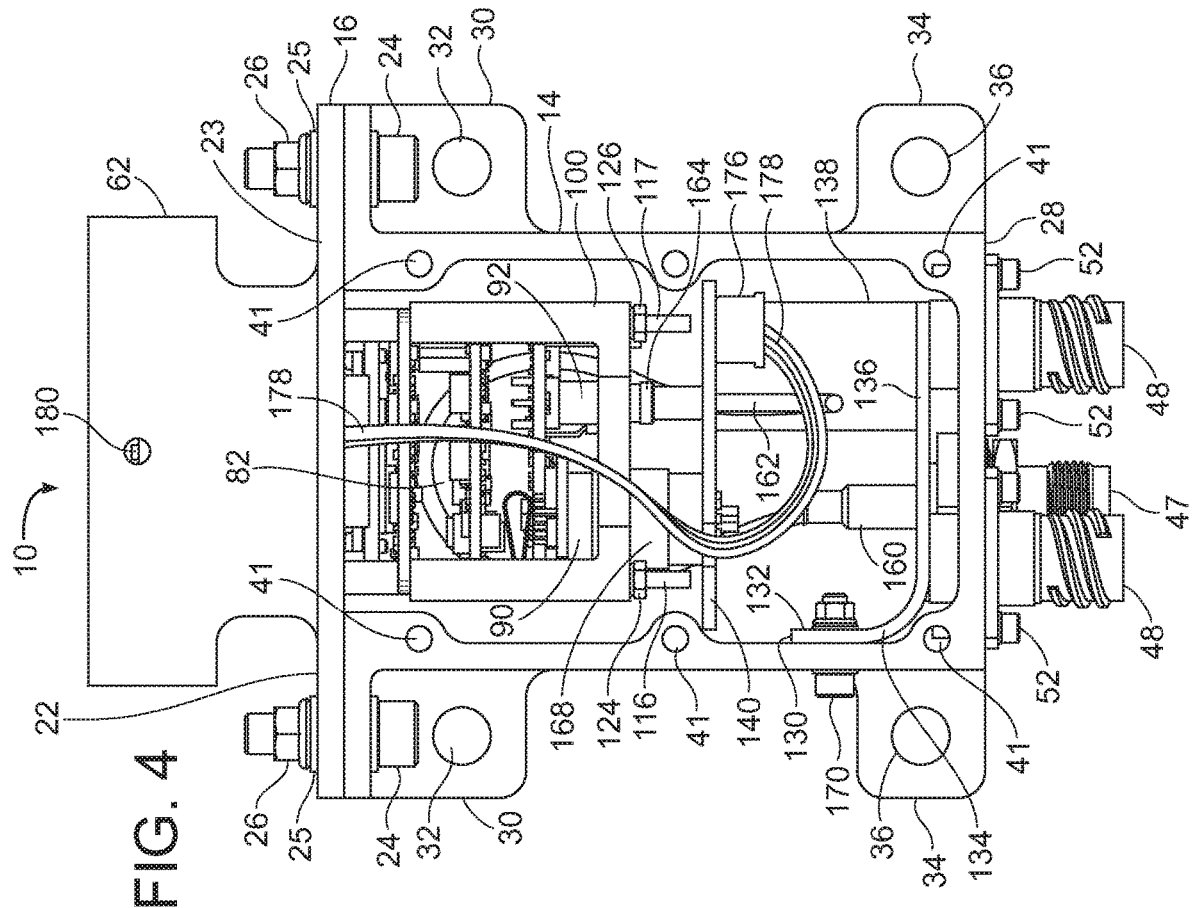
FIG. 4 is a top view of the ruggedized camera system shown in FIG. 1 with the top cover removed so as to allow viewing of the interior of the ruggedized camera system.
Figure 5:
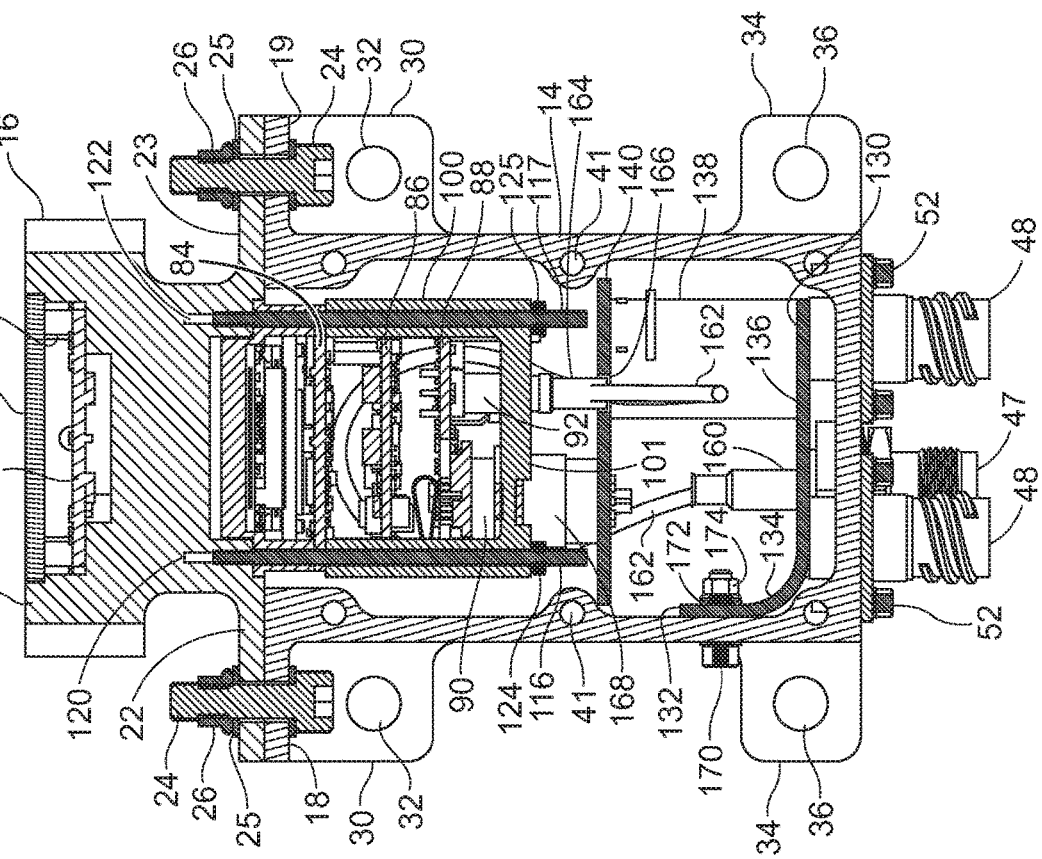
FIG. 5 is a sectional view taken along line 5-5 in FIG. 2.
Figure 8:
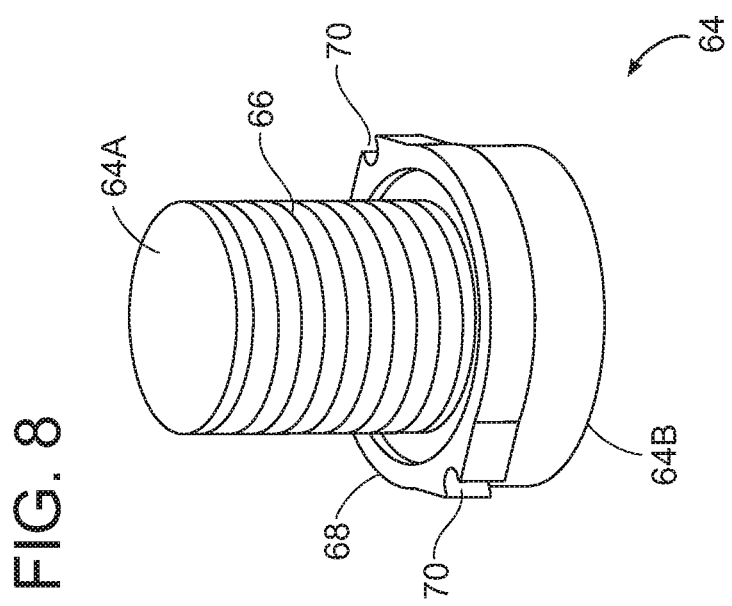
FIG. 8 is a perspective view of a camera lens assembly of the ruggedized camera system shown in FIG. 1.

Referring to FIGS. 4, 5, 7 and 9, ruggedized camera electronics holder 100 further includes bores 108, 110, 112 and 114 that extend for the entire depth of camera electronics holder 100 and are sized for receiving threaded rods 116, 117, 118 and 119, respectively. Threaded rods 116, 117, 118 and 119 extend from bores 108, 110, 112 and 114, respectively, and are threadedly engaged with corresponding threaded bores in lens housing section 16. This configuration is illustrated in FIG. 5. Threaded rods 116 and 117 are threadedly engaged with threaded bores 120 and 122, respectively, in lens housing section 16. Similarly, threaded rods 118 and 119 are threadedly engaged with corresponding threaded bores (not shown) in lens housing section 16. Nuts 124 and 125 are threadedly engaged with threaded rods 116 and 117, respectively. As shown in FIG. 9, nuts 126 and 128 are threadedly engaged with threaded rods 118 and 119, respectfully. When nuts 124, 125, 126 and 128 are tightened, camera electronics holder 100 is firmly and tightly attached to lens housing section 16. Camera electronics holder 100 is fabricated from a high-strength, light-weight metal. Suitable metals include Aluminum and Titanium.

Referring to FIGS. 3, 5, 9, 11 and 12, camera system 10 further comprises light-ring circuit 150 that is attached to the distal end portion of lens cover structure 62 and which circumferentially extends around optical lens 64C. In an exemplary embodiment, light-ring circuit 150 comprises circular circuit board 151, high-power LEDs (light-emitting diodes) 152 that are mounted to the front side of the circular circuit board 151 and linear LED drivers 153 that are mounted to the rear or back side of the circular circuit board 151. Circular circuit board 151 has central opening 154 and electrical contacts 155 to which electrical wires 178 are coupled (see FIG. 4). Electrical wires 178 electrically couple linear LED drivers 153 to other electronic circuitry within electronics housing section 14. Circular circuit board 151 includes thru-holes 156 that receive screws or fasteners. Each thru-hole 156 is aligned with a corresponding threaded thru-hole (not shown) in the distal end portion of lens cover structure 62. Camera system 10 further includes diffuser ring 157 that is attached to lens cover structure 62 so as to cover light-ring circuit 150. Diffuser ring 157 extends around optical lens 64C. Diffuser ring 157 includes thru-holes that are aligned with thru-holes 156 in circular circuit board 151. Standoffs 158 are interposed between diffuser ring 157 and circular circuit board 151 and are aligned with thru-holes 156 and the thru-holes in diffuser ring 157. Screws 159 are inserted into the thru-holes of diffuser ring 157 and through the standoffs 158 and thru-holes 156 and engage the corresponding threaded inlets (not shown) in the distal end portion of lens cover structure 62 so as to tightly attach diffuser ring 157 and light-ring circuit 150 to lens cover structure 62.

Referring to FIGS. 4, 5, 9, 10 and 13, camera system 10 further comprises power circuit 130. Power circuit 130 is attached to interior wall 131 of electronic housing section 16. In an exemplary embodiment, power circuit 130 comprises stacked layers of fiberglass reinforced epoxy laminates (i.e. FR4), dielectric materials, adhesives and copper. Power circuit 130 comprises sections 132, 134, 136, 138 and 140. Each section 132, 136 and 140 comprises a rigid circuit board and each section 134 and 138 comprises a flexible circuit that has embedded electrical conductors therein. Each flexible circuit is positioned between and in electronic signal communication with a pair of rigid circuit boards. Various electronic components 142 are mounted on the rigid circuit boards 132, 136 and 140. For purposes of simplifying the view of power circuit 130 in FIG. 13, the signal connectors are not shown and the reference number 142 is used to indicate all of the electronic components. However, it is to be understood that each electronic component 142 may be different and may perform a different function. Power circuit 130 supplies isolated power to camera electronics 82 via connectors 90 and 168. Power circuit 130 supplies isolated power to LEDs 152 and LED drivers 153 via wires 178. Power circuit 130 also provides over-voltage protection and over-current fuses. Power circuit 130 also feeds through the RS232 data lines and protects these data lines as well. Referring to FIG. 4, video signal connector 160 is separate from power circuit 130. Video signal connector 160 is connected to coaxial cable 162 and is coupled to video signal connector 47 that is attached to rear side 28 of electronics housing section 14. Coaxial cable 162 is also connected to video signal connector 164. Video signal connector 164 is connected to video signal output connector 92 of camera electronic 82. Thus, video signals outputted by camera electronics 82 are fed through connector 164, cable 162, connector 160 and then coupled to video signal connector 47. Rigid circuit board section 140 includes opening 166 (see FIG. 10) through which cable 162 and connector 164 pass. Power circuit 130 includes connector 168 that is mounted to rigid circuit board section 140 and coupled to the group of electrical contacts indicated by reference number 143 (see FIG. 13). Connector 168 is electrically coupled to signal connector 90 of camera electronics 82. As shown in FIG. 4, electrical connector 176 is electrically connected to rigid circuit board section 140 and is also electrically coupled to wires 178. As described in the foregoing description, wires 178 are coupled to electrical contacts 155 of light-ring circuit 150. Rigid circuit board section 140 provides the power for LEDs 152 and LED drivers 153 via electrical connector 176 and wires 178. Rigid circuit board section 136 includes a group of electrical contacts, indicated by reference number 144, that are coupled to one of the signal connectors 48 that is attached to rear side 28 of electronics housing section 14. Rigid circuit board section 136 includes another group of electrical contacts, indicated by reference number 145, that are coupled to the other signal connector 48. Power circuit 130 is attached to interior wall 131 of electronics housing section 14. Rigid circuit board section 132 has thru-hole 146 that is sized to receive screw 170. Screw 170 is disposed through the thru-hole 146 and a corresponding thru-hole (not shown) in electronics housing section 14. Screw 170, washer 172 and nut 174 cooperate to firmly attach power circuit 130 to interior wall 131 (see FIG. 5).

Power circuit 130 allows camera system 10 to safely operate on vehicle power and is constructed to operate in harsh environments and withstand the vibrations and shock during launch of an aircraft or spacecraft. The construction, shape, component location and the location of power circuit 130 significantly reduce the vulnerability of power circuit 130 to electro-magnetic interference (EMI).

In an exemplary embodiment, lens cover structure 62 includes threaded bores located at the twelve o'clock, three o'clock, six o'clock and nine o'clock positions. Such threaded bores are configured to receive screws that are used to move lens holder 64B in fine increments in order to focus lens optical 64C while lens assembly 64 is being epoxied in place. Such a configuration is illustrated in FIGS. 1, 4 and 9. Lens cover structure 62 includes coaxially aligned threaded bores 180 and 182 that are located at the twelve o'clock position. Lens cover structure 62 further includes coaxially aligned threaded bores 184 and 186 that are located at the six o'clock position. Due to the particular orientation of the drawing views, the threaded bores at the three o'clock position and the nine o'clock position are not shown. As shown in FIG. 9, screw 188 is configured to be threaded into threaded bores 180 and 182 so that the distal end 190 of screw 188 contact lens holder 64B. Similarly, screw 194 is threaded through threaded bores 184 and 186 until the distal end 196 of screw 194 contacts lens holder 64B. Similarly, the screws (not shown) that correspond to the three o'clock and nine o'clock positions (not shown) are threaded through the corresponding threaded bores (not shown) until the distal ends of the screws contact lens holder 65B. While the lens assembly 64 is being epoxied in place, the screws are rotated in fine increments so as to push or move lens holder 64B in desired directions until optical lens 64C is precisely focused. Thus, when the epoxy hardens, optical lens 64C is firmly positioned and precisely focused. Thereafter, each screw (e.g. screws 188 and 194) is withdrawn from the corresponding threaded bores.

Referring to FIG. 9, in some embodiments, interior region 15 of electronics housing section 14 is filled with potting material 200. In order not to obscure the view of the electronics and other components shown in FIG. 9, only a portion of potting material 200 is shown. Potting material 200 provides further resistance to shock and vibrations and protects the electronics from water, moisture or other corrosive agents and prevents gaseous phenomena such as corona discharge. Potting material 200 also prevents movement of wiring or cables within interior region 15.

Electronics housing section 14 and lens housing section 16 may be fabricated from any one of a variety of suitable light-weight metals. Suitable metals include Aluminum and Titanium. Camera system 10 is light in weight and is able to operate in harsh environments that exhibit temperature extremes, radiation, humidity and moisture, shock and vibrations and still provide high-quality image data signals. In space applications, camera system 10 provides high-quality image data signals that meet SLS video quality requirements while power circuit 130 allows camera system 10 to operate safely on SLS power.

In some embodiments, the camera system weighs less than 1.5 lbs. Camera system 10 has many applications in space, aviation, exploration, automotive racing, extreme sports, military vehicles and manufacturing. Camera system 10 is also able to withstand the shock and vibrations associated with flight either in the earth's atmosphere or in space. Thus, camera system 10 is ideal for use on aircraft and spacecraft, such as manned or unmanned rockets, satellites, space probes and space stations.

The foregoing description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize. In this regard, while the disclosed subject matter has been described in connection with various embodiments and corresponding Figures, where applicable, it is to be understood that other similar embodiments can be used or modifications and additions can be made to the described embodiments for performing the same, similar, alternative or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A ruggedized camera system for aerospace environments, comprising:
    a housing comprising an electronics housing section and a lens housing section attached to the electronics housing section, the electronics housing section having a rear side, a forward side and an interior region for the placement of electronic components, wherein the forward side has an open region adjacent to the lens housing section;
    a cover member attached to the electronics housing section so as to cover the interior region;
    a camera electronics holder positioned within the interior region of the electronic housing section and attached to the housing, wherein the camera electronics holder comprises a rear portion, a pair of opposing side portions that are contiguous with the rear portion and an open front, wherein the camera electronics holder is positioned within the interior region so that the open front of the camera electronics holder is situated within the open region of the forward side of the electronics housing section, the rear portion and side portions defining an inner space that is configured to receive camera electronics and prevent movement of the camera electronics when the camera system is subjected to vibrations or physical shock, the rear portion having a plurality of openings therein that are in communication with the inner space of the camera electronics holder;
    camera electronics positioned within the inner space of the camera electronics holder, wherein the camera electronics are secured to the camera electronics holder and extend through the open front of the camera electronics holder, the camera electronics including a plurality of signal connectors, wherein each signal connector is aligned with a corresponding opening in the rear portion of the camera electronics holder;
    a lens assembly positioned within the lens housing section and comprising a lens interface rotatably attached to the lens housing section such that the lens interface is rotatable in a clockwise direction and in a counter-clockwise direction, a lens holder attached to the lens interface and an optical lens secured within the lens holder and in optical communication with the camera electronics;
    a light-ring circuit attached to the lens housing structure and extending about the optical lens; and
    a diffuser attached to the lens housing structure and configured to cover the light-ring circuit.

2. The ruggedized camera system according to claim 1 wherein the camera electronics comprises electronic circuitry to process optical data provided by the optical lens.

3. The ruggedized camera system according to claim 1 wherein the electronics housing section further comprises an interior side within the interior region and an exterior side and wherein the ruggedized camera system further comprises:
    a plurality of electrical connectors attached to the exterior side of the electronics housing section;
    a semi-flexible electrical circuit located within the interior region of the electronics housing section and comprising a plurality of rigid circuit boards and a plurality of flexible circuits, each flexible circuit being located between and in electronic signal communication with a pair of rigid circuit boards; and wherein a first one of the rigid circuit boards is attached to the interior side of the electronics housing section and a second one of the rigid circuit boards is in electronic signal communication with the plurality of electrical connectors and a third one of the rigid circuit boards is in electronic signal communication with the camera electronics and the light-ring circuit.

4. The ruggedized camera system according to claim 1 wherein the light-ring circuit comprises:
a circular circuit board;
a plurality of light-emitting devices mounted to the circular circuit board; and
driver circuitry mounted to the circular circuit board and in electronic signal communication with the plurality of light-emitting devices.

5. The ruggedized camera system according to claim 4 wherein the plurality of light-emitting devices comprises a plurality of light-emitting diodes.

6. The ruggedized camera system according to claim 1 wherein the lens housing section comprises a lens cover structure having a substantially cylindrical shape, an interior region and a front opening that is in communication with the interior region of the lens cover structure and which provides a field of view for the optical lens.

7. The ruggedized camera system according to claim 6 wherein the lens cover structure further comprises a distal end portion that circumferentially extends about the front opening and wherein the light-ring circuit comprises a circular circuit board that is positioned on the distal end portion.

8. The ruggedized camera system according to claim 7 wherein the diffuser is attached to the distal end portion and covers the circular circuit board.

9. The ruggedized camera system according to claim 6 wherein the lens housing section has a longitudinally extending threaded bore that is in communication with the open region of the forward side of the electronics housing section and the interior region of the lens cover structure.

10. The ruggedized camera system according to claim 9 wherein the lens interface comprises a cylindrical portion having threads thereon and wherein the lens interface is threadedly engaged with the longitudinally extending threaded bore.

11. The ruggedized camera system according to claim 10 wherein the lens assembly further comprises means to produce tension on the lens interface so as to cause firm contact between the threads of the lens interface and the threaded bore.

12. The ruggedized camera system according to claim 1 wherein each side portion of the camera electronics holder is configured to have an opened region such that the camera electronics is visible.

13. The ruggedized camera system according to claim 1 further comprising means for securing the camera electronics to the camera electronics holder.

14. The ruggedized camera system according to claim 1 further comprising means for attaching the camera electronics holder to the lens housing section.

15. The ruggedized camera system according to claim 3 further comprising potting material disposed within the interior region of the electronics housing section such that the semi-flexible electrical circuit, the camera electronics and the camera electronics holder are encapsulated in the potting material.

16. The ruggedized camera system according to claim 1 wherein the lens interface comprises an M12 lens interface.

17. A ruggedized camera system for aerospace environments, comprising:
a housing comprising an electronics housing section and a lens housing section attached to the electronics housing section, the electronics housing section having an interior region, a forward side and a rear side and wherein the forward side has an open region adjacent to the lens housing section, the lens housing section comprising a front side portion and a lens cover structure extending from the front side portion, the lens cover structure having an interior region and a front opening that is in communication with the interior region of the lens cover structure, the lens housing section having a longitudinally extending threaded bore in communication with the interior region of the lens cover structure and the open region in the forward side of the electronics housing section;
a cover member attached to the electronics housing section so as to cover the interior region;
a camera electronics holder positioned within the interior region of the electronic housing section and attached to the lens housing section, wherein the camera electronics holder comprises a rear portion, a pair of opposing side portions that are contiguous with the rear portion and an open front, the camera electronics holder being positioned such that the open front is situated within the open region in the forward side of the electronics housing section, the rear portion and side portions defining an inner space that is sized for receiving camera electronics and preventing any movement of the camera electronics when the camera system is subjected to vibrations or physical shock, the rear portion having a plurality of openings therein that are in communication with the inner space of the camera electronics holder;
camera electronics positioned within the inner space of the camera electronics holder, wherein the camera electronics are secured to the camera electronics holder and extend through the open front of the camera electronics holder, the camera electronics including a plurality of signal connectors, wherein each signal connector is aligned with a corresponding opening in the rear portion of the camera electronics holder;
a lens assembly positioned within the lens housing section and comprising a lens interface having a threaded surface that is threadedly engaged with the longitudinally extending threaded bore in the lens housing section such that the lens interface is rotatable in a clockwise direction and in a counter-clockwise directions, a lens holder attached to the lens interface and an optical lens secured within the lens holder and in optical communication with the camera electronics;
a light-ring circuit attached to the lens housing structure such that the light-ring circuit extends about the front opening of the lens cover structure; and
a diffuser attached to the lens housing structure and configured to cover the light-ring circuit.

18. The ruggedized camera system according to claim 17 wherein the electronics housing section further comprises an interior side within the interior region and an exterior side and wherein the rugged camera system further comprises:

a plurality of electrical connectors attached to the exterior side of the electronics housing section;

a semi-flexible electrical circuit located within the interior region of the electronics housing section and comprising a plurality of rigid circuit board sections and a plurality of flexible circuits, each flexible circuit being located between and in electronic signal communication with a pair of rigid circuit board sections; and wherein a first one of the rigid circuit board sections is attached to the interior side of the electronics housing section and a second one of the rigid circuit board sections is in electronic signal communication with the plurality of electrical connectors and a third one of the rigid circuit board sections is in electronic signal communication with the camera electronics and the light-ring circuit.

19. The ruggedized camera system according to claim 18 further comprising potting material disposed within the interior region of the electronics housing section such that the semi-flexible electrical circuit, the camera electronics and the camera electronics holder are encapsulated in the potting material.

20. The ruggedized camera system according to claim 17 wherein the lens cover structure has a substantially cylindrical shape and a distal end portion that circumferentially extends about the front opening in the lens cover structure, the light-ring circuit comprising a circular circuit board that is attached to the distal end portion.

\* \* \* \* \*